: United States Patent (10) Patent No.: US 7,406,157 B2
Qiu et al. (45) Date of Patent: Jul. 29, 2008

(54) METHODS AND APPARATUSES FOR DETERMINING LOOP CHARACTERISTICS USING AN EXTENDED VOICE-BAND MODEM

(75) Inventors: Sigang Qiu, Raleigh, NC (US); Prashant Pratap Tawade, Raleigh, NC (US); Vedavalli G. Krishnan, Raleigh, NC (US); Wesley H. Smith, Raleigh, NC (US); Mandayam Krishnan, Raleigh, NC (US)

(73) Assignee: Intel Corporation, Santa Clara, CA (US)

(*) Notice: Subject to any disclaimer, the term of this patent is extended or adjusted under 35 U.S.C. 154(b) by 1232 days.

(21) Appl. No.: 10/655,094

(22) Filed: Sep. 3, 2003

(65) Prior Publication Data

US 2005/0047443 A1 Mar. 3, 2005

(51) Int. Cl.
- H04M 1/24 (2006.01)
- H04M 3/08 (2006.01)
- H04M 3/22 (2006.01)
- H04K 9/00 (2006.01)

(52) U.S. Cl. .......... 379/1.04; 379/1.03; 379/22.02; 379/27.08; 375/243; 375/245; 375/260; 375/316

(58) Field of Classification Search .......... 379/1.01, 379/1.03–1.04, 9, 10.01, 15.01, 22.02, 23, 379/27.01, 27.03, 27.08, 29.01, 32.04; 375/243, 375/245, 260, 316; 341/155–156, 158
See application file for complete search history.

(56) References Cited

U.S. PATENT DOCUMENTS

| 6,466,629 B1* | 10/2002 | Isaksson et al. | 375/316 |
| 6,898,210 B1* | 5/2005 | Cheng et al. | 370/480 |
| 7,310,522 B2* | 12/2007 | Geile | 455/424 |
| 2005/0047513 A1* | 3/2005 | Vitenberg | 375/260 |

* cited by examiner

Primary Examiner—Binh K Tieu
(74) Attorney, Agent, or Firm—Blakely, Sokoloff, Taylor & Zafman LLP

(57) ABSTRACT

Embodiments of the invention provide methods for determining the characteristics of a local loop using the multi-carrier tones of a DSL activation process. For one embodiment, one or more sets of downstream multi-carrier tones of a digital subscriber line activation process are received at an extended voice-band modem and are capable of transmitting upstream multi-carrier tones of the digital subscriber line activation process over a local loop. The downstream carrier tones and the upstream carrier tones are folded into a first multi-tone signal and a second multi-tone signal, respectively, each having a plurality of component signals within the spectrum band of the extended voice-based modem. The total signal power of the first multi-tone signal is divided by the power of one of the plurality of component signals of the second multi-tone signal to determine a ratio value. The ratio value is used to determine a characteristic of the local loop.

24 Claims, 7 Drawing Sheets

METHODS AND APPARATUSES FOR DETERMINING LOOP CHARACTERISTICS USING AN EXTENDED VOICE-BAND MODEM

FIELD

Embodiments of the invention relate generally to the field of broadband communication and, more specifically, to methods and apparatuses for determining the loop characteristics of a local loop to determine if the local loop supports a broadband connection.

BACKGROUND

Broadband is a form of telecommunication that employs a wide band of frequencies that allows data to be multiplexed and transmitted concurrently over different frequencies within the band. This allows more data to be transmitted at one time. Broadband technology uses frequencies that typically range from approximately 25 KHz to approximately 1.1 MHz. There are many impediments to establishing broadband communication connections over typical telecommunications networks. A typical telecommunications network supports voice-band communication. The voice-band is the range of frequencies that is generally audible and used for the transmission of speech (i.e., approximately 300 Hz-4000 kHz). A typical telecommunications system is comprised of a central office ("CO") and a connecting network (local loop). A typical network includes COs that are connected to individual end-users through a main distribution frame ("MDF"). A twisted pair of copper wires typically connects the MDF and the end-users and comprises the local loop. Local loops are generally designed for voice-band communication. Each CO is interconnected through inter-CO network.

The CO contains the necessary switching equipment and the local loop is the intermediate network between the CO and the terminating equipment, commonly referred to as customer premises equipment ("CPE"), of the end-user. CPEs may include terminals, telephones, modems, etc. that are installed at the end-user's premises and connected to the telecommunications system.

A common type of broadband connection is a digital subscriber line ("DSL"). DSL provides high-speed data access (for example, high speed Internet access). The cost is low because DSL works on existing copper telephone wires, obviating the need for costly installation of higher-grade cable.

In a typical telephone network, some local loops will support a broadband connection and some will not. That is, a local loop of a typical telecommunications system may have various characteristics that preclude or impair a DSL or other broadband connection. Typical loop impairments to a broadband connection include a loading coil present on the loop and excessive loop length, as well as cross-talking, bridge-taps, and others.

Loading Coil

A typical telephone connection traverses several COs and several local loops. A loading coil is used on the telephone line to boost the power over long distances. The loading coil prevents higher frequencies from passing. Broadband, however, uses the higher frequencies. Therefore, a telephone line having a loading coil cannot support a broadband connection. Typically, a loading coil will be employed where the CPE is approximately 18,000 feet from the CO.

Loop Length

Where a loading coil is not present on the telephone line, a broadband connection can be established. However, the local loop length affects the data transmission rate. Signals from multiple DSL connections are sent to a DSL access multiplexer ("DSLAM") for routing through a high-speed backbone (e.g., asynchronous transfer mode ("ATM")). The DSLAM is typically located at the CO. Therefore, the farther the end-user is from the CO, the lower the data transfer rate is due to the copper wires. For example, asynchronous DSL ("ADSL"), used for Internet and web access, has a downstream data transmission rate of 8.448 Mbps at 9,000 ft., but only 1.544 Mbps at 18,000 ft. for typical wire gauge (e.g., 26 American wire gage ("AWG")). Eventually a point is reached where the CO cannot provide a DSL connection to the CPE. Most forms of DSL have a practical limit of 18,000 ft.

The end-user's telephone line may have other characteristics (e.g., crosstalk) that can affect whether a broadband connection can be established and, if so, at what data transmission rate.

Once the characteristics of the telephone line are known and if the telephone line supports a broadband connection, one may be implemented. If the telephone line does not support a broadband connection, then remedial action may be taken. For example, if the characteristics precluding or degrading a broadband connection include the presence of a loading coil or excessive local loop length, the telephone company may implement another CO as necessary to enable broadband connections.

Typically, determining the characteristics of a telephone line requires a technician to go to the location of the CPE to evaluate the telephone line. This evaluation process may include installing a broadband modem on the telephone line to determine if a broadband connection is supported. Such an evaluation method is costly and time-consuming.

Methods of determining loop characteristics using information sequences exchanged between voice-band modems ("VBMs") during handshaking have not been very accurate.

BRIEF DESCRIPTION OF THE DRAWINGS

The invention may be best understood by referring to the following description and accompanying drawings that are used to illustrate embodiments of the invention. In the drawings.

DETAILED DESCRIPTION

Reference throughout the specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Moreover, inventive aspects lie in less than all features of a single disclosed embodiment. Thus, the claims following the Detailed Description are hereby expressly incorporated into this Detailed Description, with each claim standing on its own as a separate embodiment of this invention.

Process

In accordance with one embodiment, a DSL modem activation process (e.g., G.994.1) is employed together with an exVBM that is capable of initiating the process to determine loop characteristics. The G.994.1 is a current International Telecommunication Union ("ITU") standard for DSL modem handshaking procedures that provides a consistent way of initiating the various types of current and future xDSL modems. G.994.1 is fully compatible with many other activation procedures and offers additional benefits, including the exchange of information regarding modem capabilities. Using G.994.1, multiple redundant sets of tones are modulated with digital information. G.994.1 is used, initially, to determine the rate, power, pulse duration, and PSD of the broadband line probe used to characterize line attenuation and signal-to-noise ratio ("SNR") and subsequently to allow the modems to exchange details regarding attenuation and SNR. The modems use this information to determine full activation line rate and power levels and proceed to full activation. The tones and procedures were designed to be compatible with other DSLs in the network.

In order to establish the initial digital communication, G.994.1 defines several simultaneous upstream and several simultaneous downstream frequencies. G.994.1 defines 3 carrier sets in the 4.3125 kHz family, namely A43, B43, and C43. Each carrier set is designed for a different geographical region. For example, A43 is primarily for North America and regions that provide ADSL and standard telephone service on the same loop, while B43 is primarily for regions that provide ADSL and ISDN on the same loop (e.g., Germany). Each of the three carrier sets of the 4.3125 kHz family contain three frequencies. It is specified that both the CO and the CPE should transmit multi-carrier tones for initialization, and either end of the local loop may send the first signal for initialization.

Loading Coil

Figure 1:
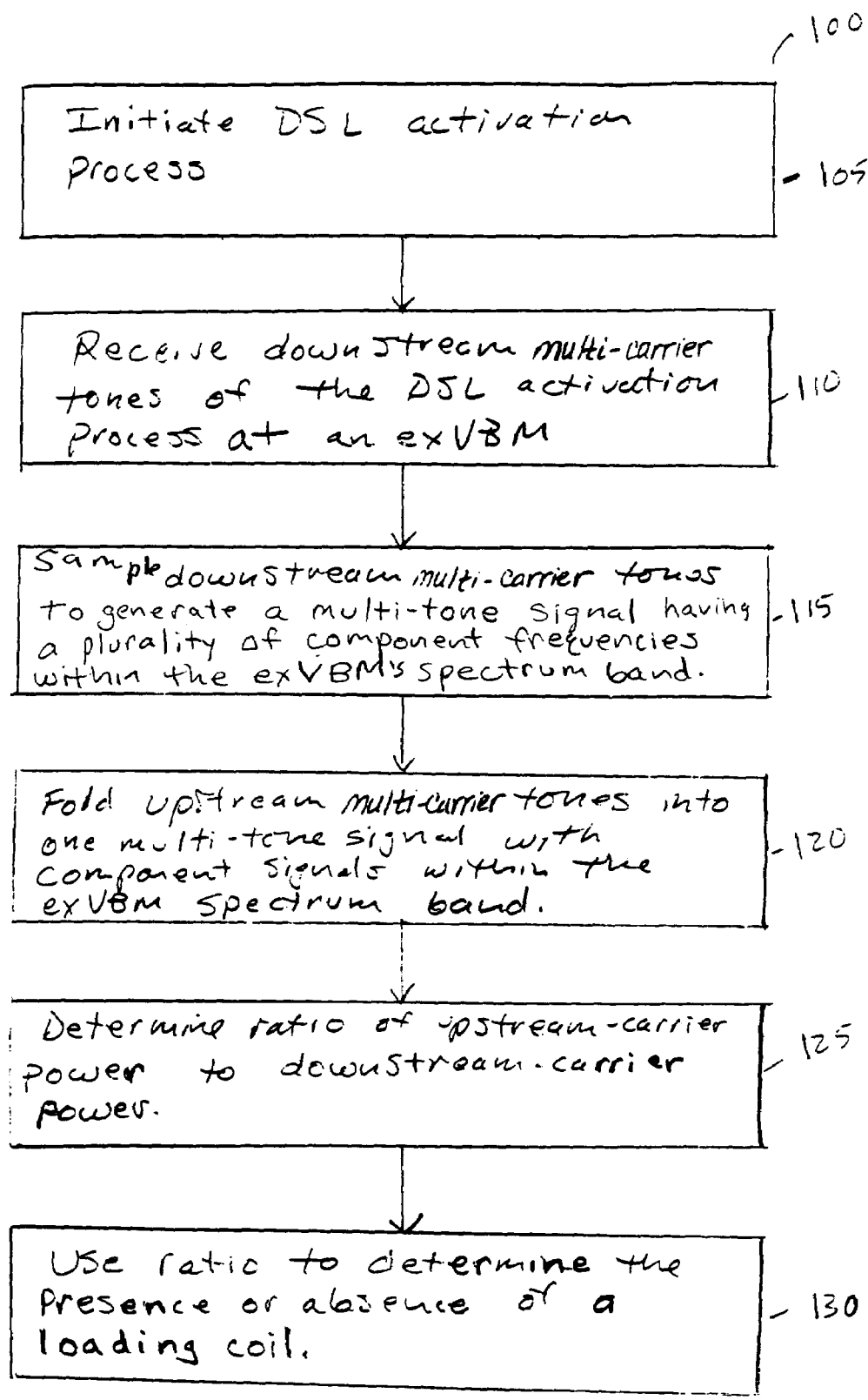
FIG. 1 illustrates a process by which a loaded loop can be distinguished from a non-loaded loop in accordance with one embodiment of the invention.

FIG. 1 illustrates a process by which a loaded loop can be distinguished from a non-loaded loop in accordance with one embodiment of the invention. Process 100, shown in FIG. 1, begins at operation 105 in which a DSL activation procedure is initiated. For one embodiment, a first modem (e.g., an exVBM) transmits a G.994.1 R-TONES-REQ signal upstream to a second modem (e.g. a DSL modem). For such an embodiment, the exVBM has a TX clock capable of sampling frequencies higher than 77.625 kHz in order to transmit the 38.825 kHz R-TONES-REQ signal.

At operation 110 the downstream multi-carrier tones of the DSL activation procedure are received at the exVBM. For example, if the DSLAM is capable of both Annex A and Annex B (i.e., carrier sets A43 and B43) of G.994.1, then the multi-carrier tones ("C-TONE") includes of carriers at 172.5 kHz, 241.5 kHz, 276 kHz, 310.5 kHz, 379.5 kHz, and 414 kHz.

At operation 115 the downstream multi-carrier tones are sampled at a sampling rate of the exVBM. Such sampling results in aliases of the multi-carrier tones, received at the exVBM, being "folded" down below the Nyquist frequency (i.e., frequencies less than half the sampling rate) for the sampling rate of the exVBM. Frequency folding refers to signal frequency aliases that have a frequency that is less than the frequency of the signal that generated the alias. The downstream multi-carrier tones are folded into one multi-tone signal with component frequencies within the exVBM spectrum band. The multi-carrier tones are folded down below the Nyquist frequency for the given sampling rate. For example, for an exVBM with a sampling rate of 9.6 kHz, the C-TONE with carriers at 172.5 kHz, 241.5 kHz, 276 kHz, 310.5 kHz, 379.5 kHz, and 414 kHz is folded into one multi-tone signal at frequencies of 0.3 kHz, 1.5 kHz, 2.4 kHz, 3.3 kHz, 4.5 kHz, and 1.2 kHz.

At operation 120 the upstream multi-carrier tones are folded into one multi-tone signal with component signals within the exVBM spectrum band. For example, for an exVBM with a sampling rate of 9.6 kHz, the R-TONE with carriers at 38.8125 kHz, 73.3125 kHz, and 107.8125 kHz is folded into frequencies of 0.4125 kHz, 3.4875 kHz, and 2.2125 kHz, respectively.

At operation 125 the USCP/DSCP ratio is determined. The USCP/DSCP is equal to the power at one or more upstream carrier frequencies divided by the power at one or more downstream carrier frequencies. For one embodiment, the downstream-carrier power is the total power at frequencies of 0.3 kHz, 1.5 kHz, 2.4 kHz, 3.3 kHz, 4.5 kHz, and 1.2 kHz and the upstream-carrier power is the power at a frequency of 0.4125 kHz.

Figure 2:
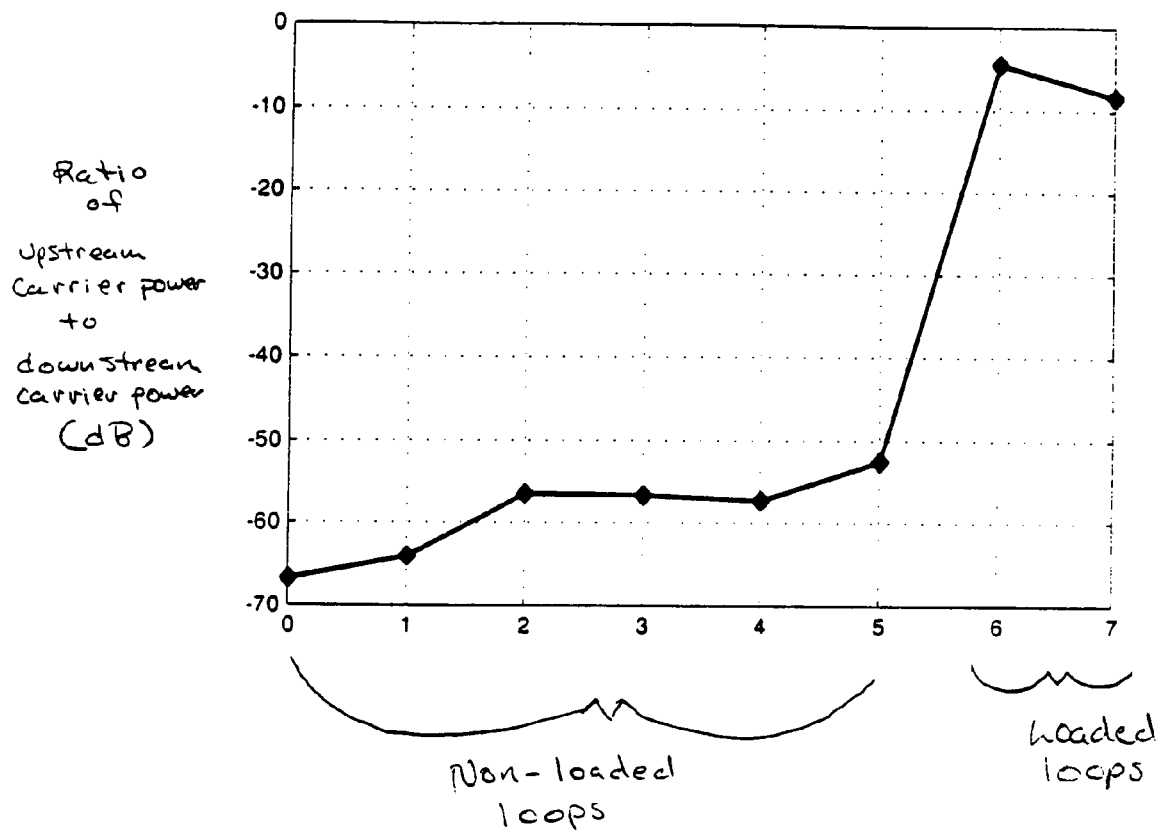
FIG. 2 illustrates the relationship between the ratio of the upstream-carrier power to the downstream-carrier power ("USCP/DSCP ratio") and the presence or absence of a loading coil in accordance with one embodiment of the invention.

At operation 130 the USCP/DSCP ratio is used to determine the presence or absence of a loading coil on the loop. For example, FIG. 2 illustrates the relationship between the USCP/DSCP ratio and the presence or absence of a loading coil in accordance with one embodiment of the invention. In FIG. 2, the USCP/DSCP ratio was calculated using the total power at frequencies of 0.3 kHz, 1.5 kHz, 2.4 kHz, 3.3 kHz, 4.5 kHz, and 1.2 kHz as the downstream-carrier power and the power at frequencies of 0.4125 kHz as the upstream-carrier power. As shown in FIG. 2, non-loaded loops 0-5, corresponding to a null loop and Electronic Industries Association ("EIA") standard loops, EIA1-EIA5, respectively, all have a USCP/DSCP ratio at or below −50 dB. The loaded loops 6 and 7, corresponding to EIA standard loops, EIA6 and EIA7, respectively, both have a USCP/DSCP ratio at or above −10 dB. Therefore, for such an embodiment, the algorithm of the present invention may determine that a loop does not have a loading coil on it if the power ratio is below a specified value (e.g., −50 dB), or conversely determine that a loop does have a loading coil on it if the power ratio is above a specified value (e.g., −10 dB).

Loop Length

Figure 3:
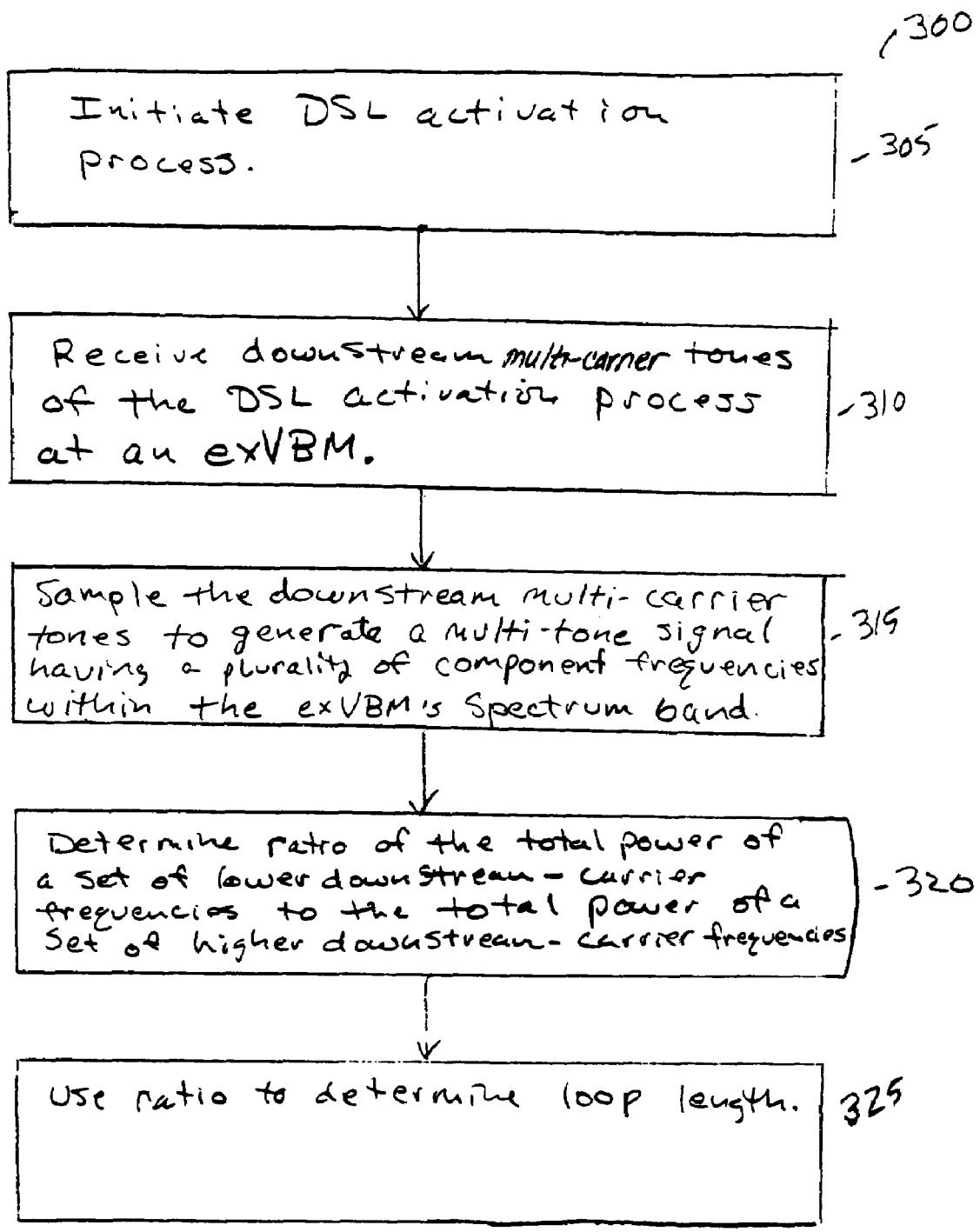
FIG. 3 illustrates a process by which loop length can be determined in accordance with one embodiment of the invention.

FIG. 3 illustrates a process by which loop length can be determined in accordance with one embodiment of the invention. Process 300, shown in FIG. 3, begins at operation 305 in which a DSL activation procedure is initiated. For one embodiment, a first modem (e.g., an exVBM) transmits a G.994.1 R-TONES-REQ signal upstream to a second modem (e.g. a DSL modem). For such an embodiment, the exVBM may have a TX clock capable of sampling frequencies higher than 77.625 kHz in order to transmit the 38.825 kHz R-TONES-REQ signal.

At operation 310 the downstream multi-carrier tones of the DSL activation procedure are received at the exVBM. For example, if the DSLAM is capable of both Annex A and Annex B (i.e., carrier sets A43 and B43) of G.994.1, then the multi-carrier tone ("C-TONE") includes of carriers at 172.5 kHz, 241.5 kHz, 276 kHz, 310.5 kHz, 379.5 kHz, and 414 kHz.

At operation 315 the downstream multi-carrier tones are sampled at a sampling rate of the exVBM. Such sampling results in aliases of the multi-carrier tones, received at the exVBM, being "folded" down below the Nyquist frequency. The downstream multi-carrier tones are folded into one multi-tone signal with component frequencies within the exVBM spectrum band. The multi-carrier tones are folded down below the Nyquist frequency for the given sampling rate. For example, for an exVBM with a sampling rate of 9.6 kHz, the C-TONE with carriers at 172.5 kHz, 241.5 kHz, 276 kHz, 310.5 kHz, 379.5 kHz, and 414 kHz is folded into one multi-tone signal at frequencies of 0.3 kHz, 1.5 kHz, 2.4 kHz, 3.3 kHz, 4.5 kHz, and 1.2 kHz.

At operation 320 the LDSCP/HDSCP ratio is determined. The LDSCP/HDSCP is equal to the power at one or more lower downstream carrier frequencies divided by the power at one or more higher upstream carrier frequencies. For one embodiment, the lower downstream-carrier frequencies are 0.3 kHz, 1.5 kHz, and 2.4 kHz, and the higher upstream carrier frequencies are 3.3 kHz, 4.5 kHz, and 1.2 kHz.

Figure 4:
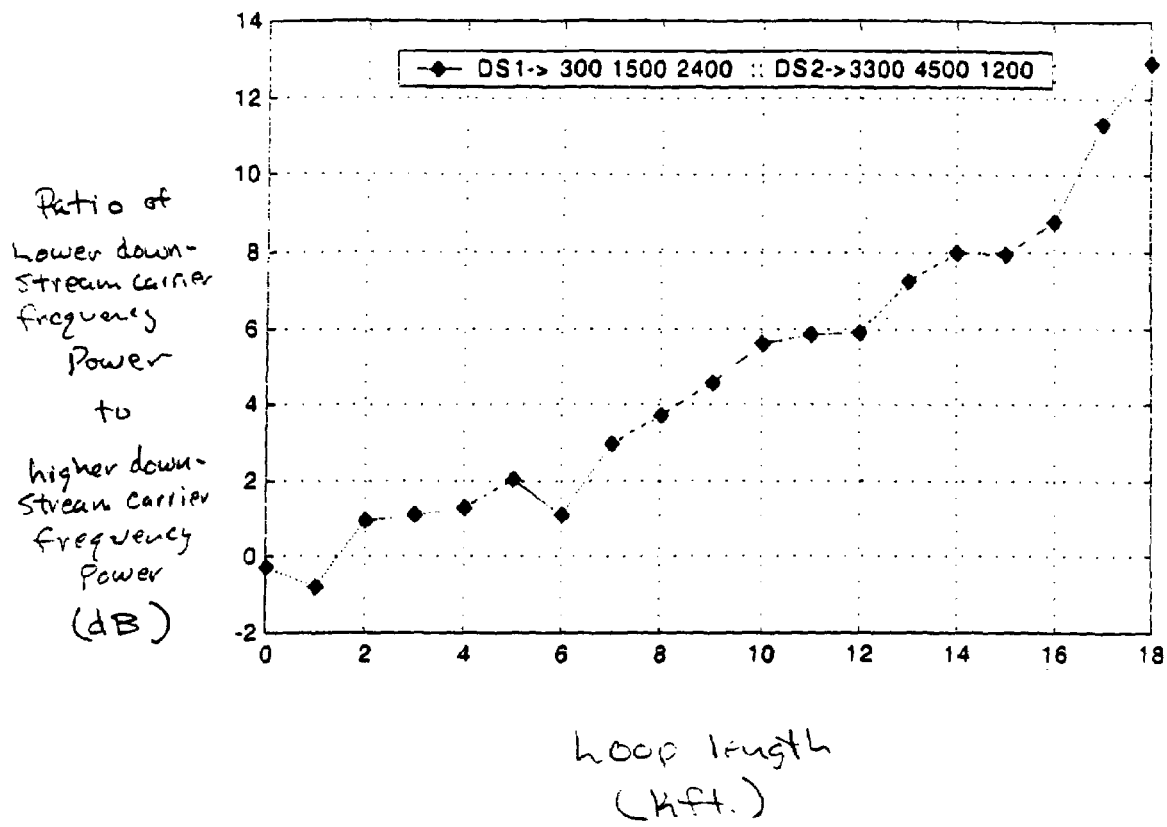
FIG. 4 illustrates the relationship between the ratio of the total power at a set of lower downstream-carrier frequencies to the total power at a set of higher downstream-carrier frequencies ("LDSCP/HDSCP ratio") and the length of the loop in accordance with one embodiment of the invention.

At operation 325 the LDSCP/HDSCP ratio is used to determine the loop length. For example, FIG. 4 illustrates the relationship between the LDSCP/HDSCP ratio and the length of the loop in accordance with one embodiment of the invention. In FIG. 4, the LDSCP/HDSCP ratio was calculated using lower downstream-carrier frequencies of 0.3 kHz, 1.5 kHz, and 2.4 kHz, and higher upstream-carrier frequencies of 3.3 kHz, 4.5 kHz, and 1.2 kHz. The LDSCP/HDSCP ratio was calculated for an exVBM having a sampling frequency of 9.6 kHz.

As shown in FIG. 4, the LDSCP/HDSCP ratio is at or less than 2 dB for loops less than 6 kft. in length. The LDSCP/HDSCP ratio ranges from 3 dB-6 dB for loops ranging in length from 7 kft.-12 kft. The LDSCP/HDSCP ratio ranges from 7 dB-13 dB for loops ranging in length from 13 kft.-18 kft.

For an exVBM having a higher sampling frequency, the relationship between the LDSCP/HDSCP ratio and the length of the loop provides a more accurate and definite indication of loop length as discussed below.

General Matters

Embodiments of the invention provide methods and apparatuses for determining loop characteristics using an exVBM, as described above. For one embodiment, the loop characteristic determination may be made in response to a user request. In alternative embodiments, the loop characteristic determination may be made automatically. For one embodiment, the algorithm of the invention may be implemented as a software addition to the software of an exVBM. While embodiments have been described that determine the presence of a loading coil on the loop and/or the length of the loop, various alternative embodiments are possible that determine other loop characteristics or impairments. For example, it is possible, within the scope of the invention, to use other techniques to determine cross-talking, bridge-taps, or other loop impairments. For example, based on the line equalizer and echo (noise reflection) information inherent in voice-band modems, the loop can be characterized up to voice band (approximately 4 KHz) and beyond based upon the sampling frequency clock of an exVBM.

For one embodiment using the G.994.1 DSL activation procedure, an exVBM having a sampling frequency of 9.6 kHz, the multi-carrier C-TONES with carriers at 172.5 kHz, 241.5 kHz, 276 kHz, 310.5 kHz, 379.5 kHz, and 414 kHz are sampled to produce a multi-tone signal at frequencies of 0.3 kHz, 1.5 kHz, 2.4 kHz, 3.3 kHz, 4.5 kHz, and 1.2 kHz. For such an embodiment, the R-TONE with carriers at 38.8125 kHz, 73.3125 kHz, and 107.8125 kHz, may be sampled to produce a multi-tone signal with frequencies of 0.4125 kHz, 3.4875 kHz, and 2.2125 kHz. In an alternative embodiment, for an exVBM having a receiver clock that supports a sampling frequency of 16 kHz, the multi-carrier C-TONES with carriers at 172.5 kHz, 241.5 kHz, 276 kHz, 310.5 kHz, 379.5 kHz, and 414 kHz may be sampled to produce a multi-tone signal with frequencies of 3.5 kHz, 1.5 kHz, 4 kHz, 6.5 kHz, 4.5 kHz, and 2 kHz, and the R-TONE with carriers at 38.8125 kHz, 73.3125 kHz, and 107.8125 kHz, may be sampled to produce a multi-tone signal with frequencies of 6.1825 kHz, 6.6875 kHz, and 4.1875 kHz.

While described for some embodiments as using the G.994.1 activation procedure to transmit tones at a frequency of 38.825 KHz, this is only an exemplary frequency and alternative or additional frequencies and other signals are also possible for various embodiments.

Figure 5:
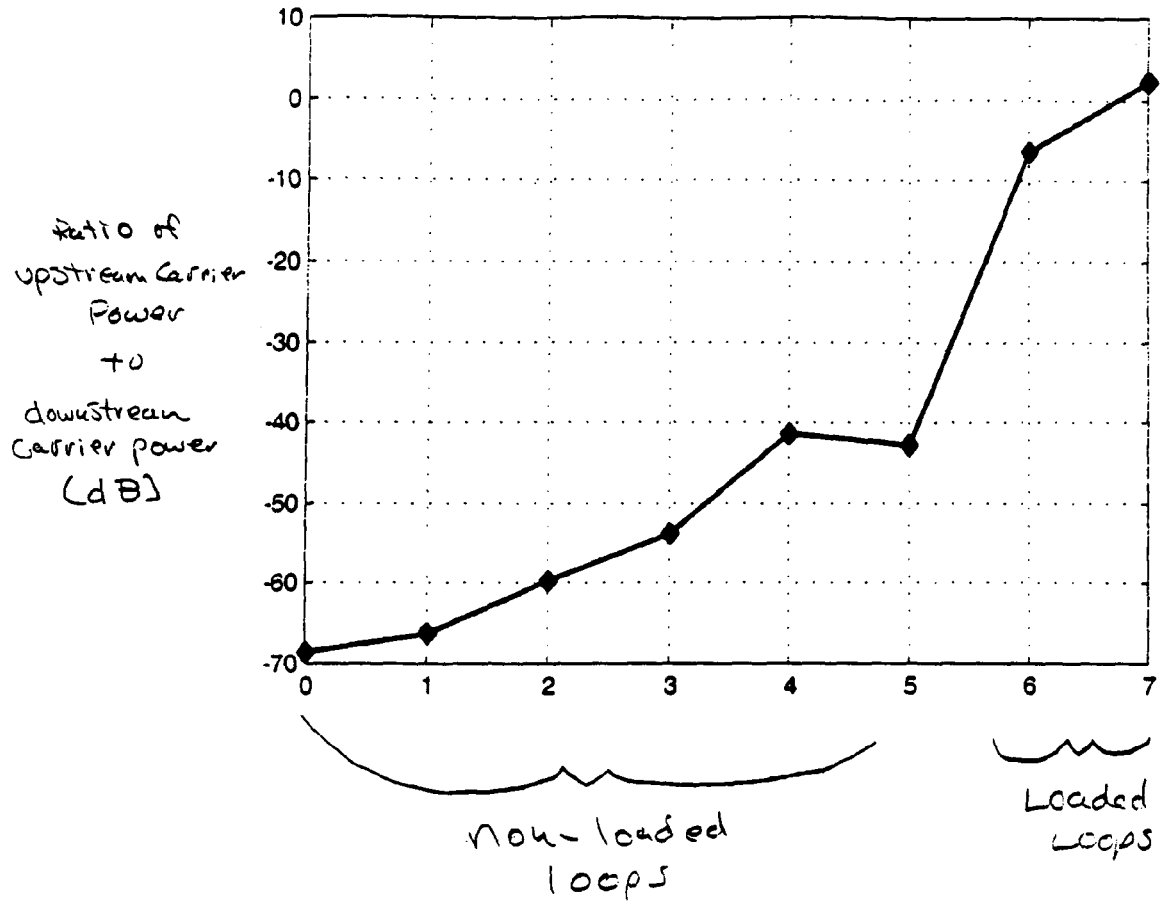
FIG. 5 illustrates the relationship between the USCP/DSCP ratio and the presence or absence of a loading coil for an exVBM having a receiver clock capable of supporting a sampling frequency of 16 kHz in accordance with one embodiment of the invention.

FIG. 5 illustrates the relationship between the USCP/DSCP ratio and the presence or absence of a loading coil for an exVBM having a receiver clock capable of supporting a sampling frequency of 16 kHz in accordance with one embodiment of the invention. For such an embodiment, the USCP/DSCP ratio was calculated using the total power at frequencies of 3.5 kHz, 1.5 kHz, 4 kHz, 6.5 kHz, 4.5 kHz, and 2 kHz, as the downstream-carrier power and the power at frequencies of 0.4125 kHz as the upstream-carrier power.

As shown in FIG. 5, non-loaded loops 0-5, corresponding to a null loop and Electronic Industries Association ("EIA") standard loops, EIA1-EIA5, respectively, all have a USCP/DSCP ratio at or below −40 dB. The loaded loops 6 and 7, corresponding to EIA standard loops, EIA6 and EIA7, respectively, both have a USCP/DSCP ratio at or above −10 dB.

Figure 6:
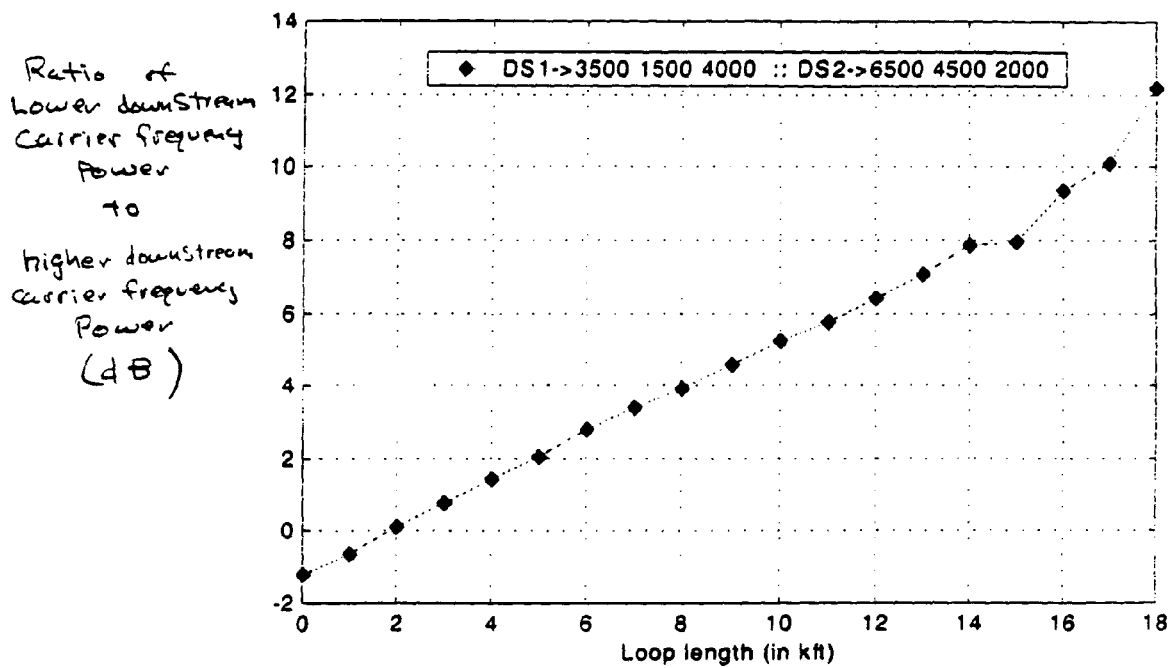
FIG. 6 illustrates the relationship between the LDSCP/HDSCP ratio and loop length for an exVBM having a receiver clock capable of supporting a sampling frequency of 16 kHz in accordance with one embodiment of the invention.

FIG. 6 illustrates the relationship between the LDSCP/HDSCP ratio and loop length for an exVBM having a receiver clock capable of supporting a sampling frequency of 16 kHz in accordance with one embodiment of the invention. For such an embodiment, the LDSCP/HDSCP ratio was calculated using lower downstream-carrier frequencies of 3.5 kHz, 1.5 kHz, and 4 kHz, and higher upstream-carrier frequencies of 6.5 kHz, 4.5 kHz, and 2 kHz. As shown in FIG. 6, the LDSCP/HDSCP ratio changes monotonically, from approximately −1 dB to approximately 12 dB, in increments of approximately 0.5 dB, as the loop length changes from 0 kft-18 kft.

Figure 7:
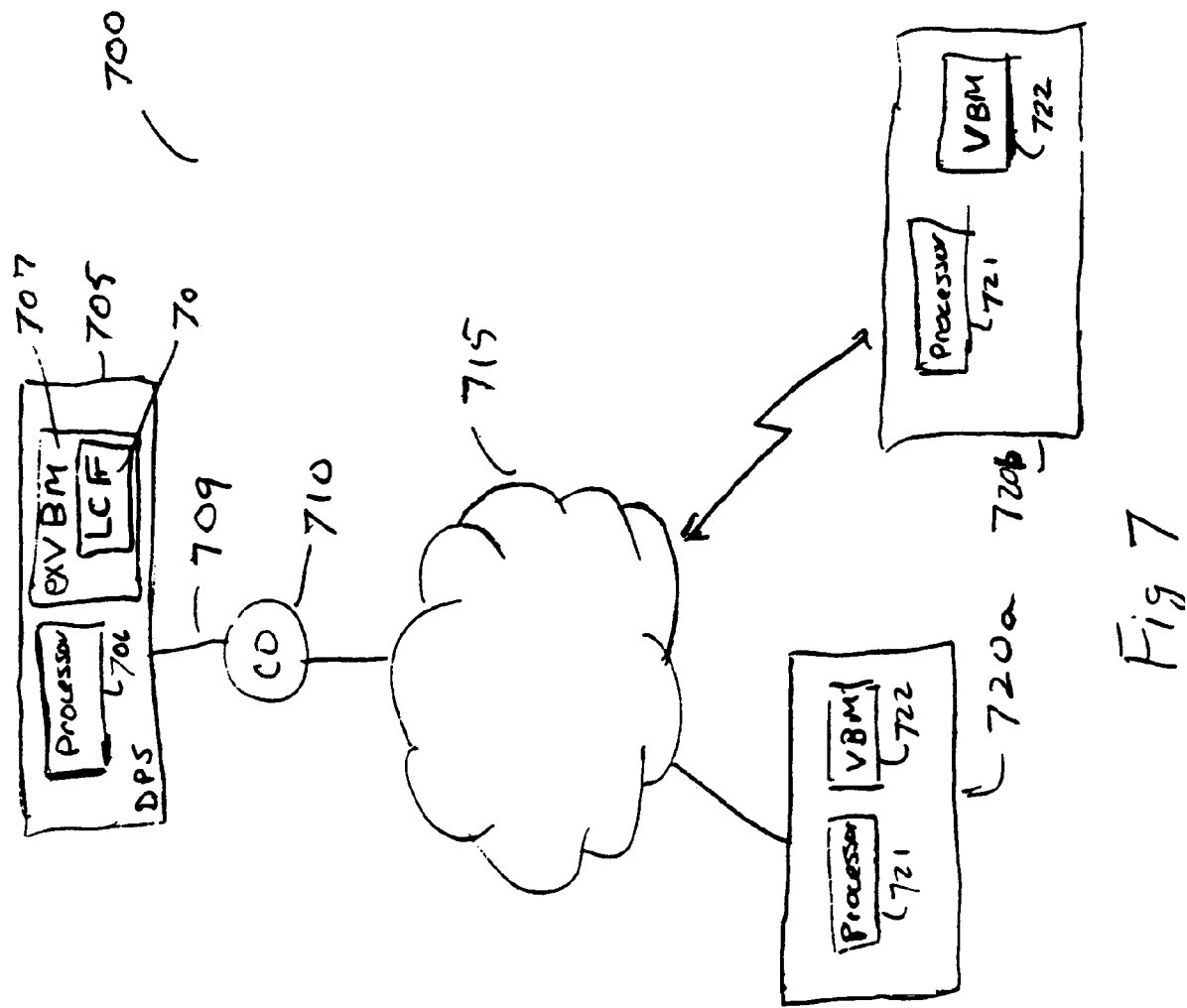
FIG. 7 illustrates a network of computing systems in which the methods and apparatuses described may be implemented and used in accordance with one embodiment of the invention.

FIG. 7 illustrates a network of computing systems in which the methods and apparatuses described may be implemented and used in accordance with one embodiment of the invention. Network 700 includes a computing system (digital processing system) 705 coupled to a CO 710 through a local loop 709 and coupled to other computing systems 720a and 720b through an Internet 715 as shown. The Internet 715 is a network of networks through which information is exchanged via the use of protocols (e.g., TCP, IP) as known in the art. Additionally or alternatively, the computing system 705 may be coupled to external computing systems over long distances via telephone lines or satellite links as part of a wide area network. Computing system 705 includes a processor 706 and an exVBM 707 having a loop characterization function ("LCF") 708. For one embodiment, the exVBM maybe capable of transmitting R-TONE-REQ signals at a frequency of 38.8125 kHz. In such an embodiment, or in alternative embodiments, the TX-clock may be capable of sampling frequencies above 77.625 kHz. In alternative embodiments, the TX-clock is capable of higher sampling frequencies and can transmit higher carrier tones, thus increasing the accuracy of the determination of loop characteristics.

In accordance with one embodiment, the LCF 708 uses the USCP/DSCP ratio of the G.994.1 DSL activation procedure to determine the presence or absence of a loading coil on the loop as described above. In accordance with one embodiment, the LCF 708 uses the LDSCP/HDSCP ratio of the G.994.1 DSL activation procedure to determine the loop length as described above.

Embodiments of the invention include various operations. It will be apparent to those skilled in the art that the operations of the invention may be performed by hardware components or may be embodied in machine-executable instructions, which may be used to cause a general-purpose or special-purpose processor or logic circuits programmed with the instructions to perform the operations. Alternatively, the steps may be performed by a combination of hardware and software. Embodiments of the invention may be provided as computer program products that may include a machine-readable medium having stored thereon instructions, which may be used to program a computer (or other electronic devices) to perform a process according to an embodiment of the invention. The machine-readable medium may include, but is not limited to, floppy diskettes, optical disks, CD-ROMs, magneto-optical disks, ROMs, RAMs, EPROMs, EEPROMs, magnetic or optical cards, flash memory, or other types of media/machine-readable medium suitable for storing electronic instructions. Moreover, embodiments of the invention may also be downloaded as a computer program product, wherein the program may be transferred from a remote computer to a requesting computer by way of data signals embodied in a carrier wave or other propagation medium via a communication cell (e.g., a modem or network connection).

Many of the methods are described in their most basic form but operations can be added to or deleted from any of the methods without departing from the basic scope of the invention.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
  receiving one or more sets of downstream multi-carrier tones over a local loop;
  transmitting upstream multi-carrier tones;
  sampling the downstream carrier tones to generate a first multi-tone signal, the first multi-tone signal having a plurality of component frequencies within a spectrum band of an extended voice-based modem;
  sampling the upstream carrier tones to generate a second multi-tone signal, the second multi-tone signal having a plurality of component frequencies within the spectrum band;
  dividing a signal power of at least one component frequency of the first multi-tone signal by a signal power of at least one component frequency of the second multi-tone signal to determine a ratio value; and
  determining a characteristic of the local loop based upon the ratio value.

2. The method of claim 1 wherein the multi-carrier tones comprise carriers at 172.5 kHz, 241.5 kHz, 276 kHz, 310.5 kHz, 379.5 kHz, and 414 kHz, the plurality of component frequencies comprise frequencies of 0.3 kHz, 1.5 kHz, 2.4 kHz, 3.3 kHz, 4.5 kHz, and 1.2 kHz, the at least one component frequency of the second multi-tone signal comprises a signal at a frequency of 0.4125 kHz, and the characteristic of the local loop is the presence of a loading coil on the local loop.

3. The method of claim 2 wherein determining a characteristic of the local loop based upon the ratio value comprises determining the presence of a loading coil on the local loop if the ratio is above a specified value, the specified value based upon the plurality of component frequencies of the first multi-tone signal and the at least one component frequency of the second multi-tone signal.

4. The method of claim 2 wherein determining a characteristic of the local loop based upon the ratio value comprises determining the absence of a loading coil on the local loop if the ratio is below a specified value, the specified value based upon the plurality of component frequencies of the first multi-tone signal and the at least one component frequency of the second multi-tone signal.

5. The method of claim 3 wherein the specified value is −10 dB.

6. The method of claim 4 wherein the specified value is −50 dB.

7. The method of claim 1 further comprising:
  dividing the plurality of component frequencies of the multi-tone signal into a lower frequency set of component frequencies and a higher frequency set of component frequencies wherein the total power of the lower frequency set of component frequencies is divided by a total power of the higher frequency set of component frequencies to determine a ratio value.

8. The method of claim 7 wherein the multi-carrier tones comprise carriers at 172.5 kHz, 241.5 kHz, 276 kHz, 310.5 kHz, 379.5 kHz, and 414 kHz, the lower frequency set of component frequencies comprises frequencies of 0.3 kHz, 1.5 kHz, and 2.4 kHz, the higher frequency set of frequencies comprises frequencies of 3.3 kHz, 4.5 kHz, and 1.2 kHz, and the characteristic of the local loop is the length of the local loop.

9. A machine-readable medium that provides executable instructions, which when executed by a processing system, cause said processing system to perform a method, the method comprising:
  receiving one or more sets of downstream multi-carrier tones over a local loop;
  transmitting upstream multi-carrier tones;
  sampling the downstream carrier tones to generate a first multi-tone signal, the first multi-tone signal having a plurality of component frequencies within a spectrum band of an extended voice-based modem;

sampling the upstream carrier tones to generate a second multi-tone signal, the second multi-tone signal having a plurality of component frequencies within the spectrum band;

dividing a signal power of at least one component frequency of the first multi-tone signal by a signal power of at least one component frequency of the second multi-tone signal to determine a ratio value; and determining a characteristic of the local loop based upon the ratio value.

10. The machine-readable medium of claim 9 wherein the multi-carrier tones comprise carriers at 172.5 kHz, 241.5 kHz, 276 kHz, 310.5 kHz, 379.5 kHz, and 414 kHz, the plurality of component frequencies comprise frequencies of 0.3 kHz, 1.5 kHz, 2.4 kHz, 3.3 kHz, 4.5 kHz, and 1.2 kHz, the at least one component frequency of the second multi-tone signal comprises a signal at a frequency of 0.4125 kHz, and the characteristic of the local loop is the presence of a loading coil on the local loop.

11. The machine-readable medium of claim 10 wherein determining a characteristic of the local loop based upon the ratio value comprises determining the presence of a loading coil on the local loop if the ratio is above a specified value, the specified value based upon the plurality of component frequencies of the first multi-tone signal and the at least one component frequency of the second multi-tone signal.

12. The machine-readable medium of claim 10 wherein determining a characteristic of the local loop based upon the ratio value comprises determining the absence of a loading coil on the local loop if the ratio is below a specified value, the specified value based upon the plurality of component frequencies of the first multi-tone signal and the at least one component frequency of the second multi-tone signal.

13. The machine-readable medium of claim 11 wherein the specified value is −10 dB.

14. The machine-readable medium of claim 12 wherein the specified value is −50 dB.

15. The machine-readable medium of claim 9 wherein the method further comprises:

dividing the plurality of component frequencies of the multi-tone signal into a lower frequency set of component frequencies and a higher frequency set of component frequencies wherein the total power of the lower frequency set of component frequencies is divided by a total power of the higher frequency set of component frequencies to determine a ratio value.

16. The machine-readable medium of claim 15 wherein the multi-carrier tones comprise carriers at 172.5 kHz, 241.5 kHz, 276 kHz, 310.5 kHz, 379.5 kHz, and 414 kHz, the lower frequency set of component frequencies comprises frequencies of 0.3 kHz, 1.5 kHz, and 2.4 kHz, the higher frequency set of component frequencies comprises frequencies of 3.3 kHz, 4.5 KHz, and 1.2 kHz, and the characteristic of the local loop is the length of the local loop.

17. A system comprising:
a processor;
an extended voice-band modem; and
a memory coupled to the processor, the memory having stored thereon one or more executable instructions, which when executed by the processor cause the processor to receive one or more sets of downstream multi-carrier tones over a local loop, transmit upstream multi-carrier tones, sample the downstream carrier tones to generate a first multi-tone signal having a plurality of component frequencies within a spectrum band of the extended voice-based modem, sample the upstream carrier tones to generate a second multi-tone signal having a plurality of component frequencies within the spectrum band, divide a signal power of at least one component frequency of the first multi-tone signal by a signal power of at least one of the component frequencies of the second multi-tone signal to determine a ratio value, and determine a characteristic of the local loop based upon the ratio value.

18. The system of claim 17 wherein the multi-carrier tones comprise carriers at 172.5 kHz, 241.5 kHz, 276 kHz, 310.5 kHz, 379.5 kHz, and 414 kHz, the plurality of component frequencies comprise frequencies of 0.3 kHz, 1.5 kHz, 2.4 kHz, 3.3 kHz, 4.5 kHz, and 1.2 kHz, the at least one component frequency of the second multi-tone signal comprises a signal at a frequency of 0.4125 kHz, and the characteristic of the local loop is the presence of a loading coil on the local loop.

19. The system of claim 18 wherein determining a characteristic of the local loop based upon the ratio value comprises determining the presence of a loading coil on the local loop if the ratio is above a specified value, the specified value based upon the plurality of component frequencies of the first multi-tone signal and the at least one component frequency of the second multi-tone signal.

20. The system of claim 18 wherein determining a characteristic of the local loop based upon the ratio value comprises determining the absence of a loading coil on the local loop if the ratio is below a specified value, the specified value based upon the plurality of component frequencies of the first multi-tone signal and the at least one component frequency of the second multi-tone signal.

21. The system of claim 19 wherein the specified value is −10 dB.

22. The system of claim 20 wherein the specified value is −50 dB.

23. A system comprising:
a processor;
an extended voice-band modem; and
a memory coupled to the processor, the memory having stored thereon one or more executable instructions, which when executed by the processor cause the processor to receive one or more sets of downstream multi-carrier tones over a local loop, transmit upstream multi-carrier tones, sample the downstream carrier tones into a multi-tone signal having a plurality of component frequencies within a spectrum band of the extended voice-based modem; divide the plurality of component frequencies of the multi-tone signal into a lower frequency set of component frequencies and a higher frequency set of component frequencies, divide a signal power of the lower frequency set of component frequencies by a signal power of the higher frequency set of component frequencies to determine a ratio value, and determine a characteristic of the local loop based upon the ratio value.

24. The system of claim 23 wherein the multi-carrier tones comprise carriers at 172.5 kHz, 241.5 kHz, 276 kHz, 310.5 kHz, 379.5 kHz, and 414 kHz, the lower frequency set of component frequencies comprises frequencies of 0.3 kHz, 1.5 kHz, and 2.4 kHz, the higher frequency set of component frequencies comprises frequencies of 3.3 kHz, 4.5 kHz, and 1.2 kHz, and the characteristic of the local loop is the length of the local loop.

* * * * *